Sept. 30, 1958 L. M. WEIXELMAN ET AL 2,854,596
STATOR FOR INDUCTION MOTOR
Filed June 4, 1956
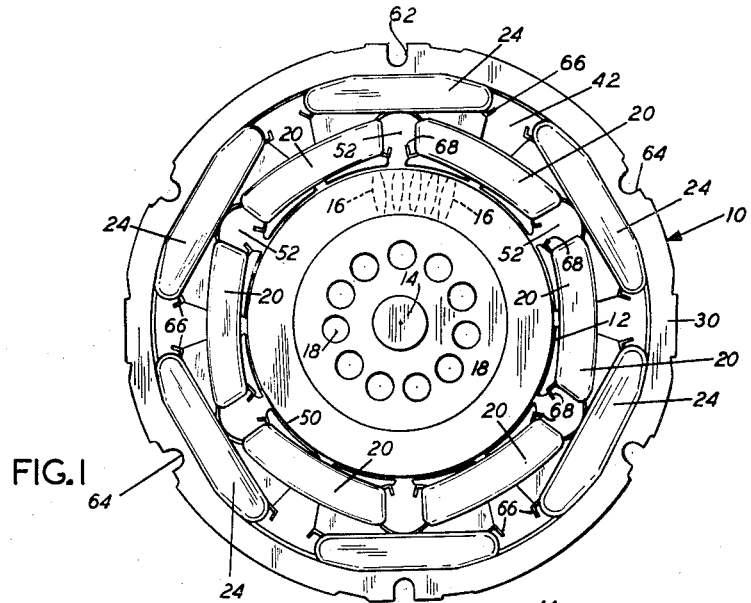
FIG. I
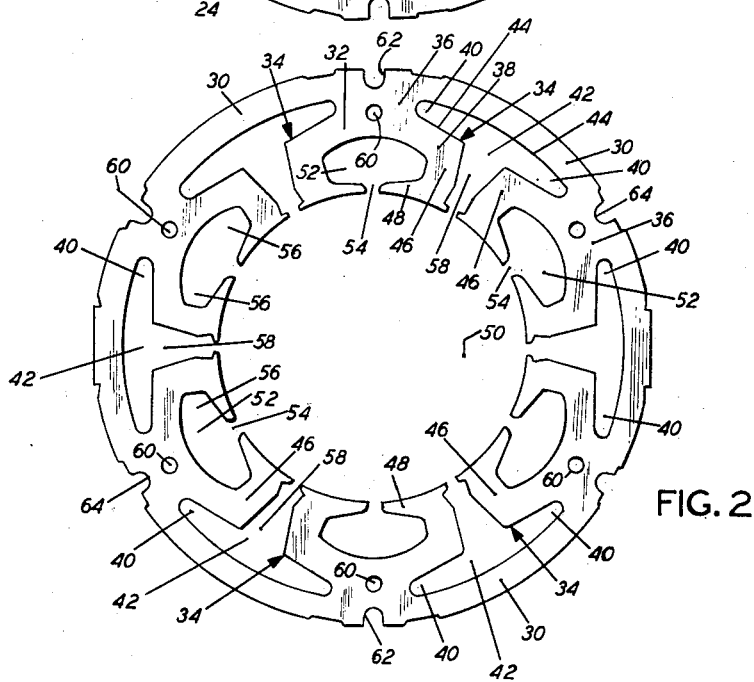
FIG. 2
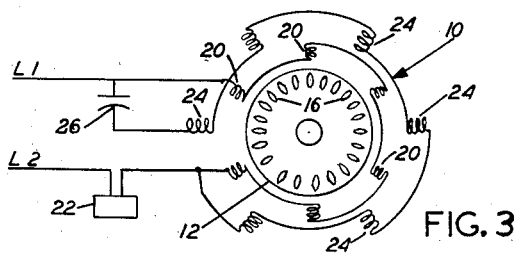
FIG. 3
INVENTORS
LAWRENCE M. WEIXELMAN
THEODORE D. BROWN
BY
Buckhorn and Cheatham
ATTORNEYS

United States Patent Office 2,854,596
Patented Sept. 30, 1958

2,854,596
STATOR FOR INDUCTION MOTOR

Lawrence M. Weixelman and Theodore D. Brown, Wichita, Kans., assignors to The O. A. Sutton Corporation, Inc., Wichita, Kans., a corporation of Kansas Application June 4, 1956, Serial No. 589,194

1 Claim. (Cl. 310—198)

This invention relates to a stator for an induction motor and more particularly to an improved stator structure particularly suitable for use in split phase motors of the capacitor type in which the auxiliary or capacitor winding is energized both during starting and running of the motor, although such structure has utility in other types of induction motors.

Split phase motors of the type in which a capacitor winding is energized both during starting and running of the motor have usually had both their main and auxiliary windings distributed and of fractional pitch. Such windings require a stator structure having a plurality of stator teeth and slots per pole and, furthermore, it is necessary to install at least one of the windings and usually both by hand, thus increasing labor costs. Even in motors employing a concentrated winding for the main motor winding, the auxiliary winding containing a capacitor in series therewith has usually been a distributed winding installed by hand in slots in the pole faces of the stator.

In accordance with the present invention, a stator structure is provided in which both a main winding and an auxiliary winding are concentrated windings and the structure is such that both windings can be installed by winding machines, for example, by the well known gun type winding machines, thus very materially lowering labor cost. The form of the stator laminations is such that one of the windings is radially spaced from the other winding. Adequate space is provided for both windings and insulation requirements between the main and auxiliary windings are minimized. In the preferred construction, the auxiliary winding containing the capacitor in series therewith is positioned radially outwardly of the main winding. This results in increased leakage reactance of the auxiliary winding and while it is desirable to maintain the leakage reactance of any field winding as low as practicable, the resulting increased leakage reactance of such winding is employed in the present stator to minimize the change in phase relationships of the currents in the main and capacitor windings between starting and running conditions of the motor, thereby enabling increased starting torque to be obtained without sacrificing running efficiency. In such preferred construction, the magneto-motive forces provided by the two windings may be made substantially equal and in time quadrature with each other under running conditions and with a load on the rotor so that a circular rotating field is produced and substantially equal amounts of power are supplied by each of the windings, while at the same time excellent starting torque is provided.

It is therefore an object of the present invention to provide an improved stator structure for induction motors having concentrated windings.

Another object of the invention is to provide a stator structure for an induction motor of the split phase capacitor type in which the capacitor winding is a concentrated winding and is spaced radially outwardly from the main winding.

Another object of the invention is to provide a stator structure for a split phase capacitor motor in which both the main and auxiliary windings are concentrated windings and increased leakage reactance of the auxiliary winding is utilized to minimize change in phase relationships of the currents in the two windings as the motor is brought from starting to running condition.

Another object of the invention is to provide an improved stator structure for a split phase capacitor type induction motor in which both the main and auxiliary windings can be rapidly positioned by known types of winding machines.

A further object of the invention is to provide an improved split phase induction motor of the capacitor type in which concentrated main and auxiliary windings are employed and which has improved operating characteristics compared to present motors having concentrated windings.

A still further object of the invention is to provide a motor of the permanent capacitor split phase type in which the main and auxiliary windings produce substantially equal magneto-motive forces in time quadrature with each other during running conditions and in which the auxiliary winding has greater leakage reactance than the main winding so that changes in the relative magnitude of the fluxes produced by such magneto-motive forces and change in the phase angle between such fluxes are minimized when the conditions of operation of the motor are changed from running to starting conditions.

Other objects and advantages of the invention will appear in the following description of a preferred embodiment shown in the attached drawings of which:

Fig. 1 is an end elevation of the motor of the present invention with the motor casing and coil connections omitted;

Fig. 2 is an end elevation of a stator lamination employed in the motor of Fig. 1; and Fig. 3 is a schematic diagram showing the electrical connections of the motor of Fig. 1.

Referring more particularly to the drawings, the motor of Fig. 1 includes a stator structure 10 and a rotor structure 12. It will be apparent that the motor will include a suitable motor casing containing bearings for the shaft 14 of the rotor 12. The rotor may be of any suitable or known type of squirrel cage rotor having a winding of suitable resistance and made up of a plurality of laminations and having conductor bars 16 positioned in properly skewed slots and also ventilating openings 18 extending axially therethrough. The other details of the motor casing and of the rotor do not form a part of the present invention and will not be further described.

The stator windings are shown in Fig. 1 and in the schematic diagram of Fig. 3 and includes a main winding made up of a plurality of coils 20 connected in series and in series with the leads L1 and L2. If an overload device 22 is employed, the main winding is also connected in series with such overload device. The auxiliary winding also contains a plurality of coils 24 connected in series and in series with a capacitor 26, the leads L1 and L2 and the overload device 22, if employed. While a series connection of the coils in each winding is shown, it is apparent that a parallel or series-parallel connection can be employed. As shown in Fig. 1 and indicated in Fig. 3, the coils 20 of the main winding are positioned closer to the rotor 12 than the coils 24 of the auxiliary winding. That is to say, the coils 24 are positioned radially outwardly of the coils 20 so as to be more remote from the rotor 12 and nearest the outer portion of the stator structure. While a 6-pole motor has been chosen for purposes of illustration, it will be apparent that the principles of the present invention may be employed in any similar motor having a plurality of poles.

A stator lamination in accordance with the present invention is shown in Fig. 2. Such lamination has outer ring portions 30 and a plurality of pole portions 32, each made up of a pair of inwardly extending teeth 34, the two teeth 34 of each pole portion 32 being mirror images of each other and forming separate halves of each pole portion. Each of the pole portions 32 has a neck portion 36 extending inwardly from the ring portions 30 and the teeth 34 have outer portions 38 which extend substantially circumferentially of the stator lamination from the neck portion 36, such outer portions 38 of the teeth being spaced radially inwardly from the ring portions 30 to provide circumferentially extending slot portions 40 forming part of a slot 42 for receiving the auxiliary winding of the motor. The outer portions of the teeth 34 extend substantially perpendicularly to a radius of the ring portion which bisects the slot 42 and have outer edges 44 in approximate alignment with each other and substantially perpendicular to such radius. The teeth 34 also have inwardly extending portions 46 extending generally radially inwardly from the outer portions 38 and terminating in pole face portions 48 which surround and define a central opening 50 for receiving the rotor 12 shown in Fig. 1. The pole face portions 48 of each tooth 34 of the same pole portion 32 extend toward each other to define a partially closed slot 52 for receiving the main winding of the motor. The slot 52 has a relatively narrow portion 54 opening into the central opening 50 of the rotor lamination and a wider portion made up of two circumferentially extending portions 56. The slot 42 has a relatively narrow portion 58 extending inwardly and gradually decreasing in width from the outer wider portion made up of the circumferentially extending portions 40 and such narrow portion opens into the central opening of the stator lamination. The pole portions 48 of the teeth 34 also extend circumferentially toward each other across the inner portion of the narrow portion 58 of the slot 42 to provide in conjunction with the narrow portion 58 a partially closed slot for the auxiliary winding.

In the structure of the stator lamination shown, the ring portion 30 between the pole portions 32 and the outer portions 38 of the teeth 34, as well as the inwardly extending portions 46 of such teeth, all have substantially the same width so as to have substantially uniform reluctance. Also the neck portions 36 have approximately twice the width of the ring portion 30, such neck portions having holes 60 therethrough for receiving rivets or other securing members for holding a plurality of the stator laminations together and the distance between the periphery of a hole 60 and a circumferentially extending portion 40 of a slot 42 being preferably the same as the width of the ring portion 30 and of the teeth 34.

The path for the main flux is relatively short and direct and merely extends around a slot 52 for the sides of a coil 20. That is to say, the length of such path is twice the length of a tooth 32 plus the short distance across the neck portion 36 joining adjacent teeth. The path for the auxiliary flux is considerably longer and is twice the length of a tooth 34 plus twice the length of a neck portion 36 plus the length of a ring portion 30. The main winding has low leakage reactance, whereas the auxiliary winding has relatively high leakage reactance. The outer portions of the stator structure between the ring portions 30 is out of the principal flux path for both the main and auxiliary flux and may have notches 62 or 64 therein for receiving tie rods or bolts for securing the end members of a motor casing in place.

The pole portions 48 of the teeth 34 are all of the same circumferential width and the portions of the slots 42 and 52 which communicate with the central opening are relatively narrow and are preferably of the same width. Thus, the opening of each slot into the central opening is of sufficient width to allow the entrance of winding machine wire carriers and also to give the required reluctance across the gap.

The form of the slots 42 enables a conventional gun type of winding machine to be employed to position all of the coils 24 of the auxiliary winding at one time, such a machine having radially extending wire carrying members which can be passed through the narrow portions 58 of the slots 42. After the coils 24 of auxiliary winding, shown in Fig. 1, have been wound in position, the coils 30 of the main winding can then be similarly simultaneously wound by a gun type of winding machine, the wire carrying radially extending members of such machine passing through the narrow portions 54 of the slots 52. As shown in Fig. 1, the coils 24 of the auxiliary winding are spaced radially from the coils 20 of the main winding so that no problem is encountered in insulating the conductors of one winding from the conductors of the other winding. A minimum of insulation, such as paper or fiber insulating strips 66 in the slots 42 and similar strips 68 in slots 52 can be employed. Motors of the permanently connected capacitor type, in which an auxiliary winding having a capacitor connected in series therewith is energized both during starting and running of the motor, and employing a stator in accordance with the present invention and a suitable rotor with properly skewed slots, are considerably less expensive to manufacture than prior motors of the same general type having approximately the same quality and efficiency.

While the stator structure of the present invention was particularly designed for employment in motors of the permanently connected capacitor type, it will be apparent that such stator structure may be employed in other types of split phase motors and in various other types of motors requiring two windings in quadrature with each other. It is to be understood that the details of the present invention may be varied and that the invention is to be limited only by the scope of the following claim.

We claim:

A split phase induction motor comprising a laminated magnetic stator structure and main and auxiliary windings on said stator structure, said stator structure having an outer ring portion, circumferentially spaced neck portions extending inwardly from said ring portion and two teeth carried by each of said neck portions and providing with said windings a plurality of pairs of poles, said stator structure having a single neck portion per pole and said teeth on each neck portion being spaced from each other to provide a single main winding slot per pole and the adjacent teeth on adjacent neck portions being spaced from each other to provide a single auxiliary winding slot per pole, said main winding having two coil sides in each said main winding slot and said auxiliary winding having two coil sides in each said auxiliary winding slot, the teeth on each of said neck portions being mirror images of each other, said teeth each having an outer portion extending from its neck portion in a direction circumferentially of said stator and an inwardly extending portion extending inwardly from said outer portion, the outer portions of adjacent teeth on adjacent neck portions extending perpendicularly to a radius bisecting the auxiliary winding slot between said adjacent teeth, said outer portion of each tooth being spaced radially inwardly from said ring portion to provide a circumferentially extending slot portion forming a part of one of said auxiliary winding slots and providing a holding portion completely circumferentially overlying a coil side of said auxiliary winding, said main winding slots circumferentially overlapping said auxiliary winding slots and all of said slots having a circumferential dimension greater than their radial dimension, said teeth carried by each of said neck portions having tip portions extending circumferentially toward each other from said inwardly extending portions, each of said tip portions completely circumferentially overlying a coil side of said main winding, said tip portions being tapered toward their free ends and defining a central opening in said stator structure for receiving a rotor, and a squirrel cage rotor positioned in said center opening.

References Cited in the file of this patent

UNITED STATES PATENTS

| | | |
|---|---|---|
| 732,822 | Bradley | July 7, 1903 |
| 765,078 | Jigouzo | July 12, 1904 |
| 2,041,875 | Stoller | May 26, 1936 |
| 2,485,628 | Morrill | Oct. 25, 1949 |
| 2,761,082 | Chang | Aug. 28, 1956 |
| 2,802,123 | Tweedy et al. | Aug. 6, 1957 |

FOREIGN PATENTS

| | | |
|---|---|---|
| 444,712 | Italy | Jan. 28, 1949 |